(12) United States Patent
Nefcy et al.

(10) Patent No.: US 9,162,664 B2
(45) Date of Patent: Oct. 20, 2015

(54) VEHICLE AND METHOD FOR CONTROLLING AN ELECTRIC MACHINE AND/OR ENGINE THEREIN

(75) Inventors: Bernard D. Nefcy, Novi, MI (US); Derek Hartl, Royal Oak, MI (US); Linda K. Ringlein, Berkley, MI (US); Ryan J. Skaff, Farmington Hills, MI (US); Christopher Adam Ochocinski, Canton, MI (US); William Paul Perkins, Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 699 days.

(21) Appl. No.: 12/773,996

(22) Filed: May 5, 2010

(65) Prior Publication Data
US 2011/0276205 A1    Nov. 10, 2011

(51) Int. Cl.
| | |
|---|---|
| B60L 9/00 | (2006.01) |
| B60W 10/08 | (2006.01) |
| B60L 15/20 | (2006.01) |
| B60W 10/06 | (2006.01) |

(Continued)

(52) U.S. Cl.
CPC ............... *B60W 10/08* (2013.01); *B60L 15/20* (2013.01); *B60W 10/06* (2013.01); *B60W 10/30* (2013.01); *B60W 20/00* (2013.01); *B60W 20/10* (2013.01); *B60W 20/40* (2013.01); *B60W 2510/244* (2013.01); *B60W 2510/305* (2013.01); *B60W 2710/0666* (2013.01); *B60W 2710/083* (2013.01); *B60W 2710/105* (2013.01); *B60W 2720/30* (2013.01); *Y02T 10/6286* (2013.01); *Y02T 10/7275* (2013.01)

(58) Field of Classification Search
CPC ..... B60W 10/08; B60W 10/06; B60W 20/00; B60W 20/10; Y10S 903/93
USPC .......................................................... 701/22
See application file for complete search history.

(56) References Cited

U.S. PATENT DOCUMENTS

| | | | |
|---|---|---|---|
| 4,923,025 | A | 5/1990 | Ellers |
| 6,216,465 | B1 | 4/2001 | Wakashiro et al. |
| 6,378,636 | B1 | 4/2002 | Worrel |

(Continued)

FOREIGN PATENT DOCUMENTS

| | | |
|---|---|---|
| EP | 1939059 A2 | 2/2008 |
| EP | 2025904 A1 | 2/2009 |

(Continued)

OTHER PUBLICATIONS

"EV Drive Mode: Drive with the gas/petro engine off" <http://www.hybridsynergydrive.com/en/ev_drive_mode.html> 1995-2008 Toyota Motor Corporation.

(Continued)

*Primary Examiner* — Behrang Badii
*Assistant Examiner* — Daniel L Greene
(74) *Attorney, Agent, or Firm* — Brooks Kushman P.C.; David B. Kelley

(57) ABSTRACT

A total power demand including a wheel power demand may be observed. The wheel power demand may be modified to determine a modified total power demand including a modified wheel power demand if the total power demand falls within a target range of power values defined by upper and lower threshold power values such that the modified total power demand is generally equal to the lower threshold power value.

17 Claims, 3 Drawing Sheets

(51) Int. Cl.
  *B60W 10/30* (2006.01)
  *B60W 20/00* (2006.01)

(56) References Cited

U.S. PATENT DOCUMENTS

| | | | |
|---|---|---|---|
| 6,676,561 B2* | 1/2004 | Fritzer et al. | 477/70 |
| 6,827,167 B2 | 12/2004 | Cikanek et al. | |
| 7,117,071 B2 | 10/2006 | Aoki et al. | |
| 7,438,042 B1* | 10/2008 | Kawada | 123/198 B |
| 7,472,769 B2 | 1/2009 | Yamanaka et al. | |
| 7,708,095 B2* | 5/2010 | Hirata | 180/65.275 |
| 7,816,805 B2* | 10/2010 | Tanaka et al. | 307/10.1 |
| 2006/0231306 A1* | 10/2006 | Severinsky et al. | 180/65.2 |
| 2008/0173485 A1 | 7/2008 | Kumazaki et al. | |
| 2008/0227590 A1* | 9/2008 | Kimura et al. | 477/3 |
| 2008/0283005 A1* | 11/2008 | Kawada | 123/90.15 |
| 2009/0058326 A1 | 3/2009 | Oyobe et al. | |
| 2010/0265050 A1* | 10/2010 | Skaff et al. | 340/438 |
| 2011/0095878 A1* | 4/2011 | Skaff et al. | 340/441 |
| 2011/0276205 A1* | 11/2011 | Nefcy et al. | 701/22 |

FOREIGN PATENT DOCUMENTS

| | | |
|---|---|---|
| JP | 2008230409 | 2/2008 |
| JP | 22008296619 A1 | 12/2008 |

OTHER PUBLICATIONS

CaseStudy: Hybrid 4WD Vehicle (H4V) <http://www.mira.co.uk/Case_Studies/documents/H4VandHybrids.pdf> printed from internet May 4, 2010.

"Hybrid Electric Vehicles: The Basics" <http://autos.yahoo.com/green_center-article_205/> Copyright 2009.

"New Prius Turns Drivers Into Bowser Wowsers" <http://www.automobilesreview.com/auto-news/new-prius-turns-drivers-into-bowser-wowsers/11462/> Auto News, Technology, Toyota, Mar. 24, 2009.

* cited by examiner

VEHICLE AND METHOD FOR CONTROLLING AN ELECTRIC MACHINE AND/OR ENGINE THEREIN

BACKGROUND

Certain hybrid electric vehicles may be caused to move by operation of an internal combustion engine and/or an electric machine. Typically, lower wheel power demands may be satisfied by operation of the electric machine (electric mode). Higher wheel power demands may be satisfied by operation of the internal combustion engine and electric machine (gas/electric mode).

SUMMARY

An automotive vehicle may include an electric machine configured to generate power to move the vehicle and at least one controller. The at least one controller may be configured to cause the machine to operate such that a power supplied by the machine to satisfy a wheel power demand is less than the wheel power demand if a total power demand falls within a target range of values.

DETAILED DESCRIPTION

Figure 1:
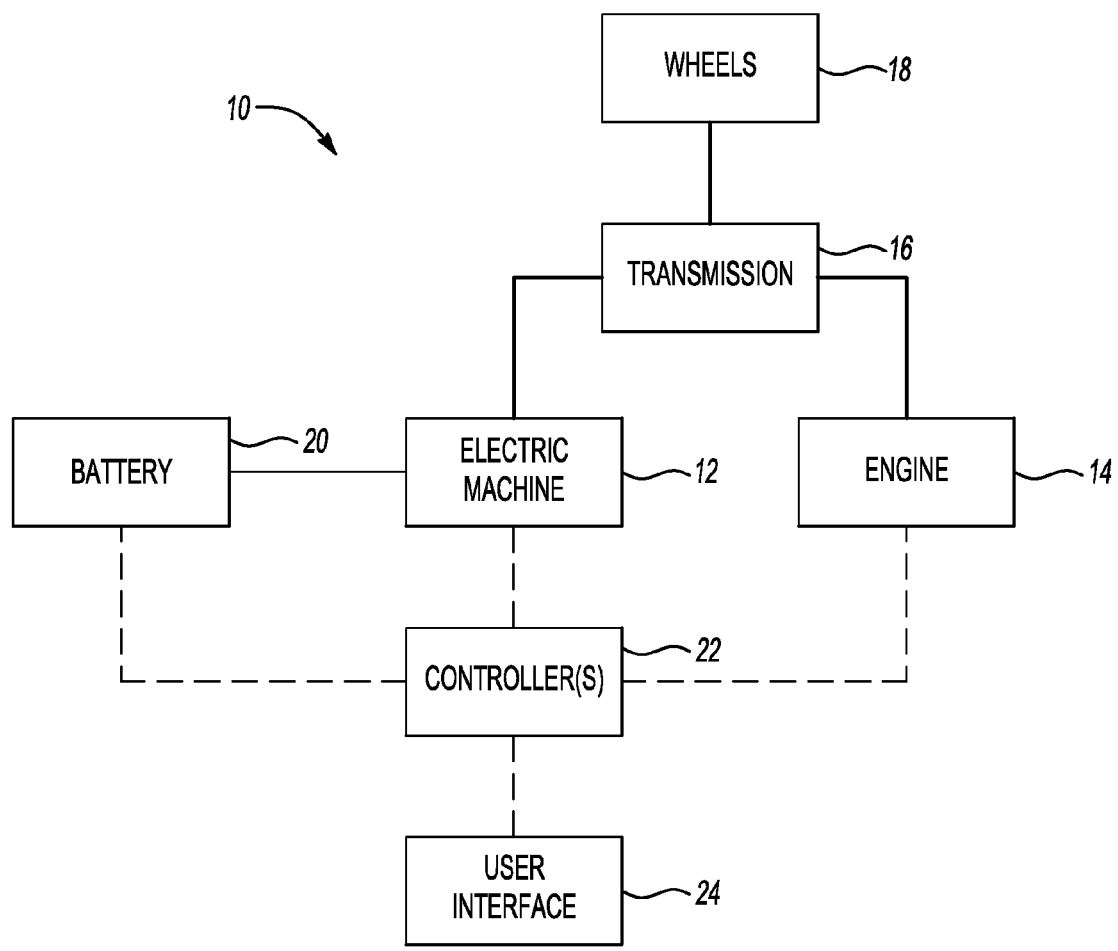
FIG. 1 is a block diagram of an embodiment of an automotive vehicle.

A driver of a hybrid electric vehicle may attempt to drive in such a manner so as to keep their vehicle in electric mode in order to improve fuel economy. A driver may carefully monitor their accelerator pedal inputs (wheel power requested) to keep the total power requested (e.g., wheel power requested plus accessory power requested plus etc.) below the engine pull-up (start-up) threshold. This can be a difficult task as the vehicle's accelerator pedal may seem to have a sensitive response-pulling-up (starting) the engine for small increases in pedal demand above the pull-up threshold. This pedal behaviour may result from attempts to make the vehicle responsive to wheel power requests from the driver.

Certain embodiments disclosed herein may provide a driver-selected mode of operation wherein an observed driver power requested is truncated (filtered/modified) such that the actual total power requested is held to a threshold value (e.g., an engine pull-up threshold power value) if the observed total power requested falls within a range of values. (The threshold value may vary depending on vehicle parameters such as battery state of charge, temperature, etc.) This range of values may be defined, on the lower end, by the engine pull-up threshold power value and, on the upper end, as a percentage (fixed or variable) beyond the threshold, or by a predefined fixed amount. The observed driver power requested may not be so truncated if the observed total power requested is greater than the range of values.

Once the observed total power requested exceeds the upper end of the range, the observed driver power requested may not be truncated as described above unless the observed total power requested first falls below the engine pull-up threshold power value. Alternatively, the observed driver power requested may be truncated whenever the observed total power requested falls within the range of values, whether or not the observed total power requested has previously exceeded the upper end of the range. Other arrangements and strategies are also possible.

As an example, the engine pull-up threshold power value may be 22 kW. (Power to satisfy requests of 22 kW and below will be generated via electric machine.) Observed driver power requests will not be truncated if the observed total power requested is equal to or less than 22 kW. Observed driver power requests will be truncated such that the actual total power requested is held to the 22 kW threshold if the observed total power requested is greater than 22 kW but less than, for example, 24 kW (about 110% of the 22 kW threshold). Observed driver power requests will not be truncated if the observed total power requested is greater than 24 kW. (Power to satisfy requests of 24 kW and above will be generated via electric machine and engine.) If the observed total power requested subsequently drops below 24 kW (but not below 22 kW), observed driver power requests may not be truncated. (Hence in these circumstances, power to satisfy requests between 22 kW and 24 kW will be generated via electric machine and engine.) Alternatively, observed driver power requests may be truncated whenever the observed total power requested falls between 22 kW and 24 kW. (Hence, power to satisfy requests between 22 kW and 24 kW will be generated via electric machine.) The above (and below) example algorithms may thus assist a driver in staying in electric mode.

Referring to FIG. 1, an automotive vehicle 10 may include an electric machine 12, an internal combustion engine 14, a transmission 16, wheels 18, a battery 20, one or more controllers 22 and a user interface 24 (e.g., button, touch screen, voice recognition module, etc.)

The electric machine 12 and/or engine 14 may be mechanically connected with the wheels 18 via the transmission 16 in any suitable/known fashion. That is, the electric machine 12 and/or engine 14 may drive the wheels 18; the engine 14 may drive the electric machine 12 and/or wheels 18. The battery 20 stores electrical power consumed and/or generated by the electric machine 12. Other vehicle arrangements are, of course, also possible. For example, several electric machines may be configured in any known/suitable fashion to provide power to move the vehicle, etc.

The one or more controllers 22 are in communication with and/or control the electric machine 12, engine 14, battery 20, and user interface 24.

A driver of the vehicle 10 may select a mode of operation that assists the driver in keeping the vehicle 10 in electric mode via the user interface 24. This selection may cause the one or more controllers 22 to control driver power requests as described, for example, with reference to FIGS. 2 and 3.

Figure 2:
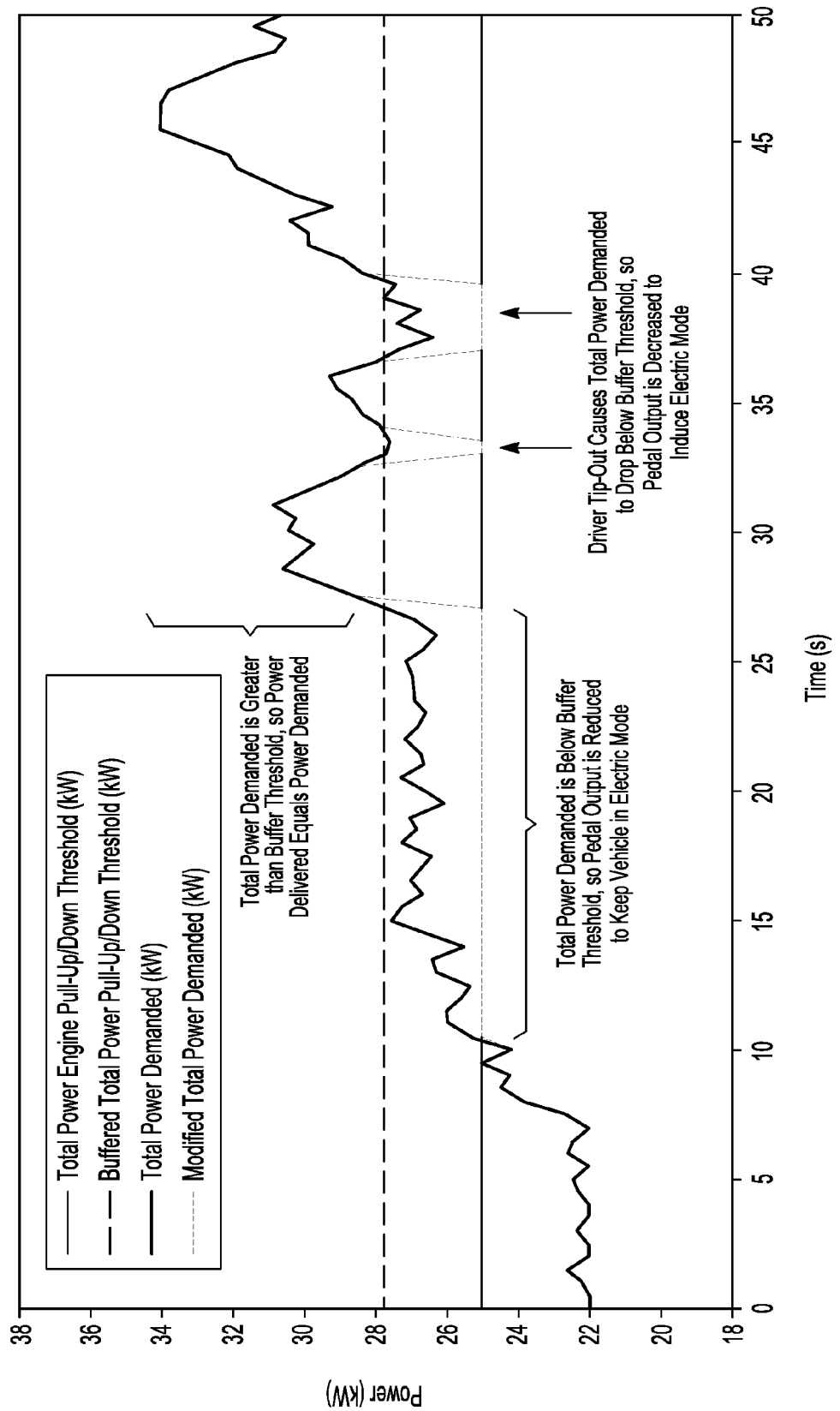
FIG. 2 is an example plot of total power versus time.

Referring to FIGS. 1 and 2, an example plot of power versus time shows that in "electric assist" mode the observed power requested may be modified to keep the vehicle 10 in electric mode for longer periods of time during a given drive cycle.

The total power engine pull-up threshold, $TP_{pul}$ may be determined by the one or more controllers 22 via, for example, the following relationship $$TP_{pul} = TP_a - P_{pue} - A_D - L \qquad (1)$$

where $TP_a$ is the total power available, $P_{pue}$ is the power to pull-up the engine 14, $A_D$ is the power necessary to satisfy accessory loads (or accessory load power demanded) such as an electrically powered air conditioner, etc., and L is the power losses within the system (e.g., power losses associated with circuitry electrically connected with the one or more controllers 22). Any suitable relationships and/or techniques, however, may be used to determine the thresholds, parameters, etc. disclosed herein.

The total power available, $TP_a$, may be determined by the one or more controllers 22 via, for example, the following relationship $$TP_a = El_{pa} + En_{pa} \qquad (2)$$

where $El_{pa}$ is the electrical power available (from the battery 20) and $En_{pa}$ is engine power available (if the engine 14 is on).

The one or more controllers 22 may be configured to collect information from, for example, a controller area network (not shown) and/or suitable sensors such that $P_{pue}$, $A_D$, $El_{pa}$, and $En_{pa}$ of (1) and (2) may be observed and/or determined in any known/suitable fashion. L of (1) may be determined, for a given vehicle, via testing, simulation, etc.

The total power engine pull-up threshold, $TP_{pul}$, for the purposes of this example, is 25 kW. As apparent to those of ordinary skill, however, this threshold may vary over time depending on the value of the variables of (1) and (2) at any given instant.

The buffered total power engine pull-up threshold, $BTP_{pul}$, may be determined by the one or more controllers 22 via, for example, one of the following relationships $$BTP_{pul} = TP_{pul} * B_{up1} \qquad (3)$$

or $$BTP_{pul} = TP_{pul} + B_{up2} \qquad (4)$$

where $B_{up1}$ and $B_{up2}$ may be constants or dynamic functions of the parameters of (1) and/or (2), and/or other suitable parameters (e.g., rate of change of wheel power demanded (explained in more detail below), rate of change of accessory load power demanded, etc.)

The buffered total power engine pull-up threshold, for the purposes of this example, is 28 kW. As apparent to those of ordinary skill, however, this threshold may vary over time depending on the value of $TP_{pul}$, $B_{up1}$ and/or $B_{up2}$ at any given instant.

The total power engine pull-down (shut-down) threshold, $TP_{pdl}$, may be determined by the one or more controllers 22 via, for example, the following relationship $$TP_{pdl} = TP_a - P_{pde} - A_D - L \qquad (5)$$

where $P_{pde}$ is the power to pull-down (shut-down) the engine 14.

The buffered total power engine pull-down threshold, $BTP_{pdl}$, may be determined by the one or more controllers 22 via, for example, one of the following relationships $$BTP_{pdl} = TP_{pdl} * B_{dn1} \qquad (6)$$

or $$BTP_{pdl} = TP_{pdl} + B_{dn2} \qquad (7)$$

where $B_{dn1}$ and $B_{dn2}$ may be constants or dynamic functions of the parameters of (1) and/or (2), and/or other suitable parameters.

Figure 3:
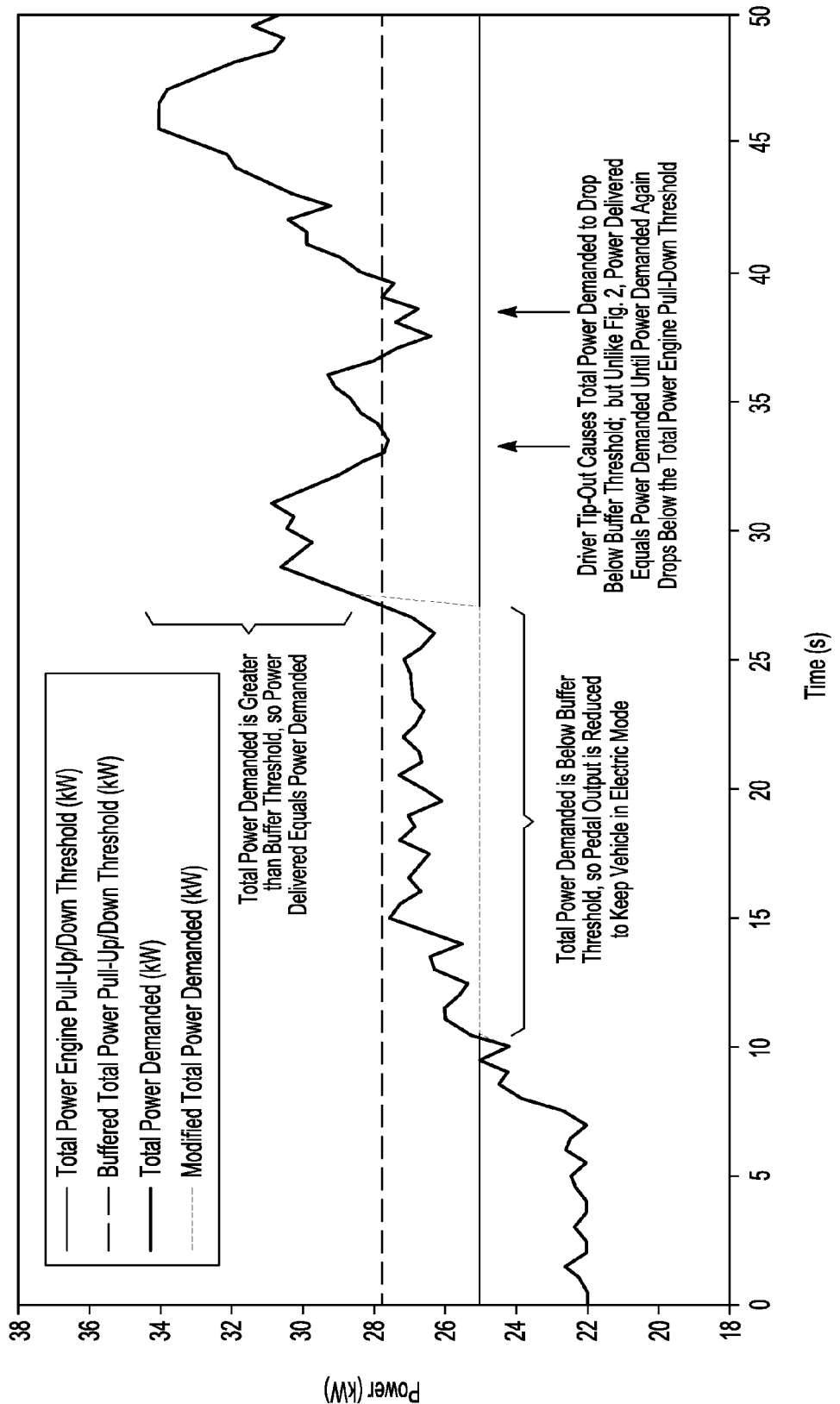
FIG. 3 is an example plot of total power versus time.

The power to pull-up the engine 14, $P_{pue}$, and the power to pull-down the engine 14, $P_{pde}$, are assumed to be equal in the example of FIG. 2 (and FIG. 3). Hence, the total power engine pull-up threshold, $TP_{pul}$, and the total power engine pull-down threshold, $TP_{pdl}$, are equal. In embodiments where the power to pull-up the engine 14, $P_{pue}$, and the power to pull-down the engine 14, $P_{pde}$, are not equal, these thresholds may be different.

The parameters, in the example of FIG. 2 (and FIG. 3), used to determine the buffered total power engine pull-up threshold, $BTP_{pul}$, and the buffered total power engine pull-down threshold, $BTP_{pdl}$, are also assumed to be equal. Hence, the buffered total power engine pull-up threshold, $BTP_{pul}$, and the buffered total power engine pull-down threshold, $BTP_{pdl}$, are equal. In embodiments where the parameters used to determine the buffered total power engine pull-up/pull-down thresholds are different, the buffered thresholds may be different. (Those values of power that fall between the threshold and buffered threshold thus form a target or specified range of values.)

The electric machine 12 may be operated to satisfy total power demands (including wheel power demands) equal to or less than the buffered engine pull-up/pull-down threshold. The engine 14 may be operated (possibly in tandem with the electric machine 12) to satisfy total power demands (including wheel power demands) greater than the buffered engine pull-up/pull-down threshold.

In the following examples, observed (input to the one or more controllers 22) total power demanded, $P_D$, and modified/filtered (actual or output by the one or more controllers 22) total power demanded, $P_{MD}$, is plotted versus time. The observed total power demanded, $P_D$, includes the observed (input) wheel power demanded, $W_{pd}$, accessory load power demanded, $A_D$, as well as any other power demands or losses on the system. Power demands and losses other than the observed wheel power demanded, $W_{pd}$, for the purposes of these examples however, are assumed to be generally constant. Changes in the observed total power demanded, $P_D$, therefore, result from changes in the observed wheel power demanded, $W_{pd}$.

The modified total power demanded, $P_{MD}$, includes the modified/filtered (actual or output) wheel power demanded, $W_{pmd}$ accessory load power demanded, $A_D$, as well as any other power demands or losses on the system. Changes in the modified total power demanded, $P_{MD}$, result from changes in the modified wheel power demanded, $W_{pmd}$ (similar to the modified total power demanded, $P_D$).

Between 0 and 10 seconds, the observed total power demanded, $P_D$, is less than the total power engine pull-up/pull-down threshold. Hence, the observed wheel power demanded, $W_{pd}$, is not modified.

The one or more controllers 22 may determine the observed wheel power demanded, $W_{pd}$, via, for example, the following relationship $$W_{pd} = W_{td} * M_s \qquad (8)$$

where $W_{td}$ is the wheel torque demanded and $M_s$ is the motor speed.

The one or more controllers 22 may determine the wheel torque demanded, $W_{td}$, via, for example, the following relationship $$W_{td} = A_p + B_p + O_{vdr} \qquad (9)$$

where $A_p$ is accelerator pedal position, $B_p$ is brake pedal position, and $O_{vdr}$ is other vehicle dynamic requests (ABS, Traction Control, etc.)

The one or more controllers 22 may be configured to collect information, for example, from a controller area network (not shown) and/or suitable sensors such that $A_p$, $B_p$, and $O_{vdr}$ of (9) may be observed and/or determined in any known/suitable fashion.

Between 10 and 27 seconds, the observed total power demanded, $P_D$, is greater than the total power engine pull-up/pull-down threshold and less than the buffered total power engine pull-up/pull-down threshold. Hence, the one or more controllers 22 modify the observed wheel power demanded, $W_{pd}$, such that the modified total power demanded, $P_{DM}$, is generally held at the total power engine pull-up/pull-down threshold. This modified total power demanded, $P_{DM}$, is used to determine what power should be generated by the electric machine 12.

At about 27 seconds, the observed total power demanded, $P_D$, becomes greater than the buffered total power engine pull-up/pull-down threshold. As a result, the engine 14 is pulled-up and the modified wheel power demanded, $W_{pmd}$, is increased in a filtered and/or controlled fashion by the one or more controllers 22 (e.g., ramped up) so that it eventually becomes equal to the observed wheel power demanded, $W_{pd}$.

Between about 33 and 34 seconds and 36 and 40 seconds, the observed total power demanded, $P_D$, is less than the buffered total power engine pull-up/pull-down threshold. As a result, the engine 14 is pulled-down and the observed wheel power demanded, $W_{pd}$, is decreased (modified) in a filtered and/or controlled fashion by the one or more controllers 22 (e.g., ramped down) such that the modified total power demanded, $P_{DM}$, is generally held at the total power engine pull-up/pull-down threshold during these time periods.

Referring to FIGS. 1 and 3, another example plot of power versus time shows that in "electric assist" mode the observed power requested may be modified to keep the vehicle 10 in electric mode for longer periods of time during a given drive cycle. Once the observed total power demanded, $P_D$, is greater than the buffered total power engine pull-up/pull-down threshold (and the engine 14 is thus pulled-up), subsequent circumstances where the observed total power demanded, $P_D$, is less than the buffered total power engine pull-up/pull-down threshold (but still greater than the total power engine pull-up/pull-down threshold), however, will not result in the engine 14 being pulled-down. Hence, the observed wheel power demanded, $W_{pd}$, during the time periods from about 33 and 34 seconds and 36 and 40 seconds will not be modified. The engine 14 will not be pulled-down until the observed total power demanded, $P_D$, becomes less than the total power engine pull-up/pull-down threshold. Other scenarios are, of course, also possible. For example, the engine 14 may be pulled-down if the observed total power demanded, $P_D$, remains less than the buffered total power engine pull-up/pull-down threshold (but still greater than the total power engine pull-up/pull-down threshold) for some predetermined period of time (e.g., 3 seconds, etc.)

As apparent to those of ordinary skill, the algorithms disclosed herein may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle comprising:
   an engine and not more than one electric machine each configured to generate power to move the vehicle; and
   a controller configured to cause the electric machine to operate, while the engine is off, such that power supplied by the electric machine to satisfy a wheel power demand is less than the wheel power demand in response to a total power demand falling within a target range of values.

2. The vehicle of claim 1 further comprising a power storage unit configured to store power for consumption by the electric machine, wherein the target range of values depends on an amount of power available from the power storage unit.

3. The vehicle of claim 1 wherein the target range of values depends on an accessory load power demand.

4. The vehicle of claim 1 wherein the target range of values depends on electrical losses associated with circuitry operatively associated with the at least one controller.

5. The vehicle of claim 1, wherein the controller is further configured to cause the electric machine and engine to operate such that a power supplied by the electric machine and engine to satisfy the wheel power demand is generally equal to the wheel power demand in response to the total power demand exceeding the target range of values.

6. The vehicle of claim 5, wherein the controller is further configured to cause the electric machine and engine to operate such that a power supplied by the electric machine and engine to satisfy a wheel power demand is generally equal to the wheel power demand in response to the total power demand having previously exceeded the target range of values and having yet to fall below a threshold value.

7. The vehicle of claim 5 wherein the target range of values depends on the power to pull-up the engine.

8. A method comprising:
   by at least one controller,
   observing a total power demand including a wheel power demand,
   modifying, while an engine is off, the wheel power demand to generate a modified total power demand including a modified wheel power demand in response to the total power demand falling within a target range of power values defined by upper and lower threshold power values such that the modified total power demand is generally equal to the lower threshold power value, and
   outputting the modified wheel power demand to an electric machine.

9. The method of claim 8 further comprising causing, by the at least one controller, power to be generated by the electric machine to satisfy at least a portion of the modified wheel power demand.

10. The method of claim 8 wherein modifying the wheel power demand to generate the modified total power demand including the modified wheel power demand includes decreasing the wheel power demand.

11. The method of claim 8 further comprising, by the at least one controller, increasing the modified wheel power demand in response to the total power demand exceeding the target range of power values.

12. The method of claim 8 wherein the wheel power demand is modified to determine the modified total power demand including the modified wheel power demand in response to the total power demand falling within a target range of power values defined by upper and lower threshold power values for a predetermined period of time.

13. The method of claim 8 wherein the upper and lower threshold power values depend on a power to pull-up an engine.

14. The method of claim 8 wherein the upper and lower threshold power values depend on a power to pull-down an engine.

15. A hybrid electric vehicle including an engine and not more than one electric machine each configured to generate power to move the vehicle comprising:

at least one controller configured to (i) cause the electric machine, while the engine is off, to operate such that a power supplied by the electric machine to satisfy a wheel power demand is less than the wheel power demand in response to a total power demand falling within a target range of values and (ii) cause the engine to be pulled-up in response to the total power demand exceeding the target range of values.

16. The vehicle of claim 15 wherein the at least one controller is further configured to cause the engine to be pulled-down in response to the total power demand falling within the target range of values after exceeding the target range of values.

17. The vehicle of claim 15 wherein the at least one controller is further configured to cause the engine to be pulled-down in response to the total power demand falling below the target range of values after exceeding the target range of values.

\* \* \* \* \*